United States Patent [19]
Jordan

[11] 3,985,112
[45] Oct. 12, 1976

[54] METHODS AND APPARATUS FOR IMPROVING FUEL VAPORIZATION IN INTERNAL COMBUSTION ENGINES

[76] Inventor: Wilmer C. Jordan, 3915 W. Wrightwood Ave., Chicago, Ill. 60647

[22] Filed: Sept. 22, 1975

[21] Appl. No.: 615,385

Related U.S. Application Data
[63] Continuation of Ser. No. 378,836, July 13, 1973, abandoned.

[52] U.S. Cl. .................... 123/122 H; 123/122 AA; 123/141; 48/180 R;180 H
[51] Int. Cl.² ........................................ F02M 31/00
[58] Field of Search .. 123/122 H, 122 AA, 122 AB, 123/122 R, 141; 48/180 H, 180 R; 261/144, 145; 165/52

[56] References Cited
UNITED STATES PATENTS

| | | |
|---|---|---|
| 1,300,630 | 4/1919 | Mathis .......................... 123/122 AA |
| 3,042,016 | 7/1962 | Christian ....................... 123/122 AA |
| 3,787,037 | 1/1974 | Motooka ........................ 123/122 H |
| 3,814,071 | 6/1974 | Buchwald ...................... 123/122 H |

*Primary Examiner*—Charles J. Myhre
*Assistant Examiner*—R. H. Lazarus
*Attorney, Agent, or Firm*—Brezina & Lund

[57] ABSTRACT

Methods and apparatus for improving fuel vaporization in internal combustion engines in which a high temperature fluid, preferably the engine exhaust gas, is supplied to flow through an internal passage of heater means disposed in the air-fuel flow path of the engine to heat an external surface of the heater means and to radiate an optimum amount of heat into the fuel for vaporization of the fuel. The flow of the high temperature fluid is controlled to maintain the heat radiating surface of the heater means at a certain temperature which is preferably decreased as ambient temperature is increased.

9 Claims, 5 Drawing Figures

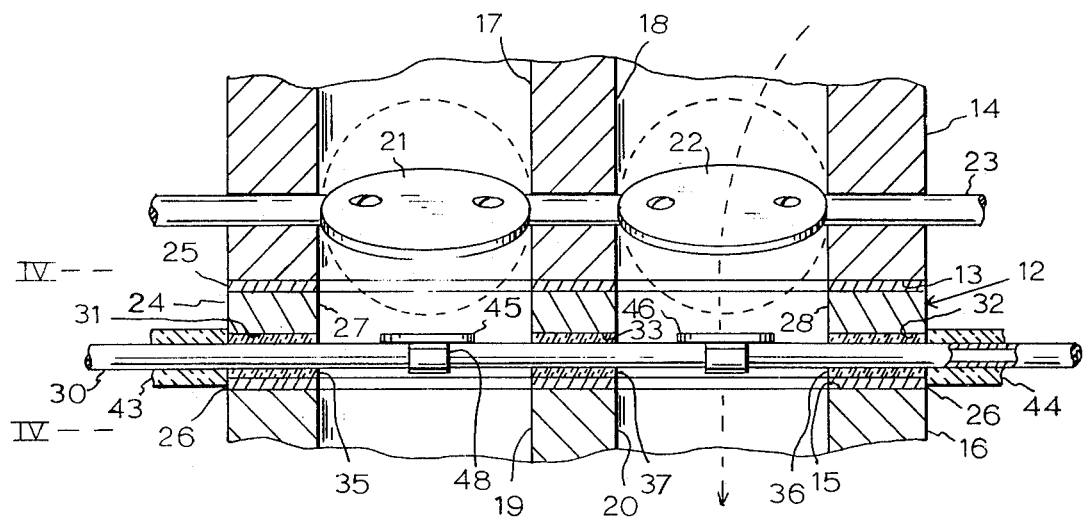
FIG. 3
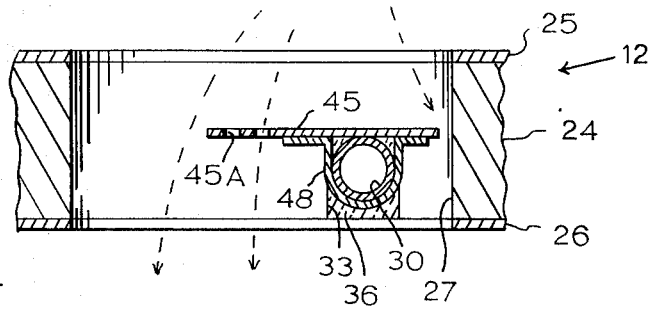
FIG. 4
FIG. 5
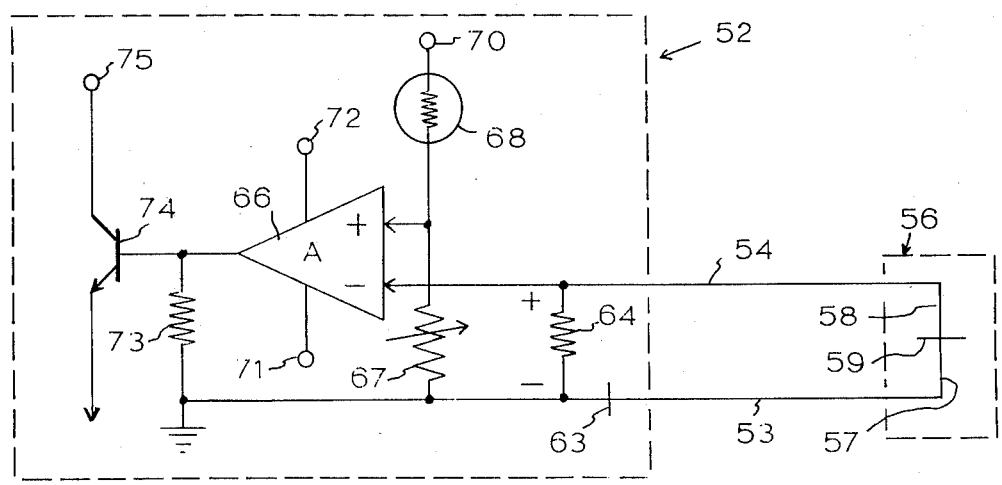

METHODS AND APPARATUS FOR IMPROVING FUEL VAPORIZATION IN INTERNAL COMBUSTION ENGINES

This is a continuation of application Ser. No. 378,836, filed July 13, 1973, now abandoned.

BACKGROUND OF THE INVENTION

This invention relates to methods and apparatus for improving fuel vaporization in internal combustion engines and more particularly to methods and apparatus whereby the fuel is vaporized in a manner such as to obtain optimum engine performance.

There are many prior art disclosures directed to various forms of electric heating devices for use in engines for improving fuel vaporization. None of such devices have had any known notable success with the exception of the devices disclosed in my prior U.S. Pat. No. 3,556,065 issued Jan. 19, 1971, my prior application Ser. No. 171,110, filed Aug. 12, 1971 and my prior application Ser. No. 351,464 filed Apr. 16, 1973. In accordance with the disclosure of my aforesaid. prior U.S. Pat. No. 3,556,065, it is found that optimum performance of an engine is achieved by using electric heating means to supply a certain amount of radiant heat into an air-fuel mixture, effective to cause the engine to develop maximum torque and acceleration while operating within normal ranges of load, speed and ambient temperature conditions and with the throttle valve means of the engine fully open, average torque and acceleration being reduced in proportion to a reduction of the amount of radiant heat below the optimum amount and being also reduced in proportion to an increase in the amount of radiant heat above the optimum amount.

The electric heating devices of my aforesaid patents and patent applications are highly advantageous and, in addition to producing a marked increase in torque and acceleration, such devices also produce, at the same time, an increase in efficiency. A great many tests have been conducted showing very substantial increases in gas mileage. Such devices do, however, require a substantial amount of electrical power which may, for example, be on the order of 55 watts for an engine having a displacement of 240 cubic inches, the required power being correspondingly lower or higher for smaller or larger engines. Also, considerable care must be exercised in constructing the electric heating elements to obtain reliable operation and long life.

SUMMARY OF THE INVENTION

This invention was evolved with the general object of providing an alternative to the devices of my aforesaid patent and patent applications, to obtain comparable results without requiring electric heating means.

In accordance with this invention, heater means are disposed in an air-fuel flow path of an engine, the heater means having internal fluid flow passage and an external surface for radiation of heat into the fuel, and a high temperature fluid, preferably the exhaust gas from the engine, is caused to flow through the internal fluid flow passage of the heater means to heat the external surface thereof to a high temperature and to cause radiation of radiant heat from the external surface into the fuel vaporization thereof.

In accordance with a very important feature, the amount of heat radiated from the exterior surface of the heating means is an optimum amount effective to cause the engine to develop maximum average torque and acceleration while operating within normal ranges of load, speed and ambient temperature conditions and with the throttle valve means of the engine fully open.

A specific feature is in the control of the supply of the high temperature fluid to maintain the exterior surface of the heater means at a certain temperature.

Another specific feature is in the control of the supply of the high temperature fluid in response to ambient temperature in a manner such that the certain temperature at which the exterior surface of the heater means is maintained is reduced in response to an increase in the ambient temperature.

Additional features relate to the control of the supply of high temperature fluid through electrically operated valves, electrical circuitry and electrical signal generating temperature sensing means.

Still further features relate to the construction and mounting of the heater means and the fluid supply means. On important aspect is in the construction and mounting such that the heat is efficiently radiated into the fuel with minimum heating of the metal walls defining the air-fuel flow path.

This invention contemplates other objects, features and advantages which will become more fully apparent from the following detailed description taken in conjunction with the accompanying drawings.

BRIEF DESCRIPTION OF THE DRAWINGS

FIG. 3 is a sectional view taken substantially along line III—III of FIG. 2;

FIG. 4 is a sectional view, on an enlarged scale taken substantially along line IV—IV of FIG. 2; and FIG. 5 is a schematic electrical diagram.

Figure 1:
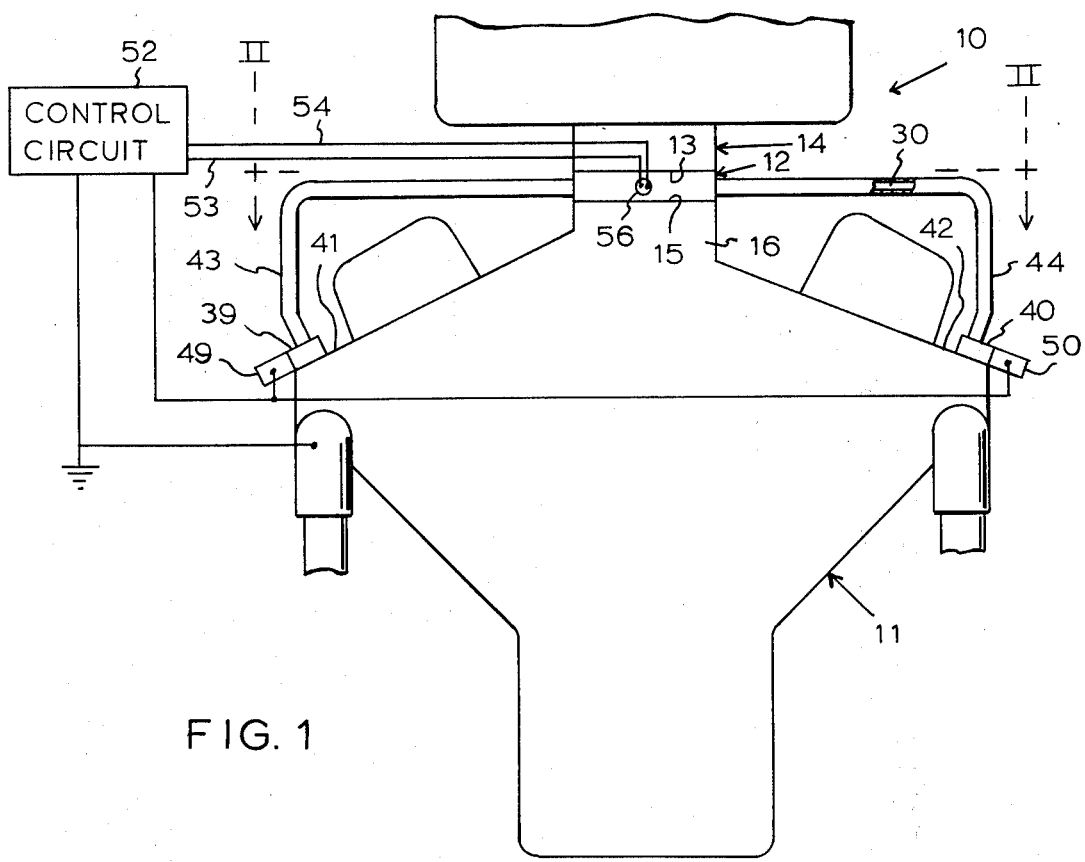
FIG. 1 is a view diagrammatically showing an engine and elevation and showing the mounting of apparatus according to the invention, with electrical control circuitry being also shown diagrammatically.
Figure 2:
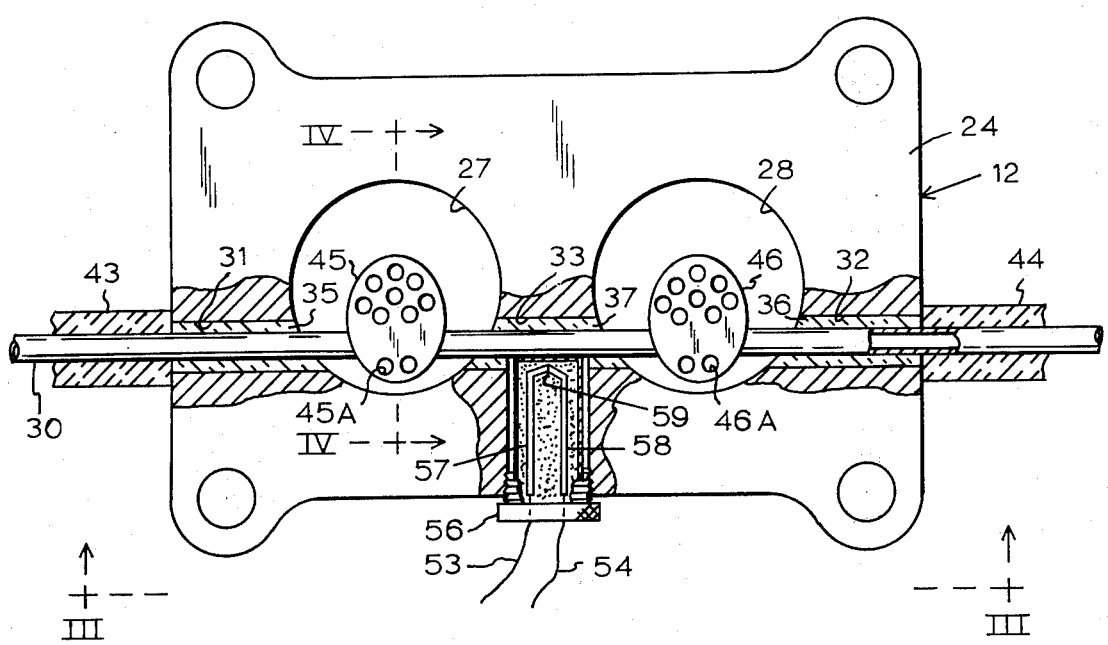
FIG. 2 is a sectional view taken substantially along line II—II of FIG. 1, constituting a top plan view of a mounting plate and heating means of the apparatus.

Reference numeral 10 generally designates fuel vaporizing apparatus constructed in accordance with the principles of this invention, shown installed on a V8 engine 11 illustrated diagrammatically in FIG. 1. In general, the apparatus 10 comprises a device 12 installed between the lower mounting surface 13 of a carburetor 14 and an upper surface portion 15 of an intake manifold 16 of the engine. The illustrated carburetor 14 is a two-barrel carburetor having two parallel fuel passages 17 and 18 aligned with passages 19 and 20 of the intake manifold 16, with a pair of butterfly throttle valves 21 and 22 being supported in the passages 17 and 18 by means of a common shaft 23. The valves 21 and 22 are shown in closed positions in full lines in FIG. 3, the fully open positions thereof being shown in broken lines.

The device 12 comprises a mounting plate 24 clamped between the carburetor mounting surface 13 and the intake manifold surface portion 15, preferably with gaskets 25 and 26 sandwiched between surfaces 13 and 15 and the opposite planar surface of the plate 24. Plate 24 has through passages 27 and 28 for flow of mixed air and fuel from the carburetor passages 17 and 18 to the intake manifold passages 23 and 24. It is here noted that the passages 27 and 28 need not be separate but may be a single passage, although two separate passages are preferred.

A tube 30 extends through the passages 27 and 28, preferably in a plane spaced from a plane through the axes of the passages 17 and 18 toward the surface portion of the passages 17 and 18 which are adjacent the lowermost edge portions of the throttle valves 21 and 22 in the closed positions thereof. Tube 30 is disposed in aligned notches 31, 32 and 33 formed in the lower surface of the plate 24, notches 31 and 32 being located between passages 27 and 28 and the opposite sides of the plate 24 and notch 33 being located in the portion of the plate 24 between the passages 27 and 28. Heat insulation members 35, 36 and 37 are disposed in the notches 31, 32 and 33 to minimize transfer of heat from the tube 30 to the plate 24 and to allow the tube 30 to be heated to a high temperature, so as to maximize radiation of heat into the fuel while minimizing transfer of heat to the walls defining the air-fuel flow passages.

In the illustrated arrangement, the tube 30 is heated from tension exhaust gas, opposite ends of the tube 30 being connected through valves 39 and 40 to exhaust manifolds 41 and 42 of the engine 11. With both valves 39 and 40 open, exhaust gas flows in one direction when the exhaust pressure builds up following the firing of a cylinder on one side of the engine and in the reverse direction following the firing of a cylinder on the opposite side of the engine. The portions of the tube 30 between the device 12 and the valves 39 and 40 are preferably enclosed within casings 43 and 44 of heat insulating material such as asbestos, minimizing heat conduction from the tube 30 and allowing the portion thereof in the device 12 to reach a high temperature.

With the tube 30 being heated to a high temperature by the exhaust gas, fuel droplets of the air-fuel mixture passing by the tube 30 are vaporized by radiant heat therefrom.

In accordance with a specific feature, a pair of baffle plates 45 and 46 are mounted on the upper sides of the tube 30 in the passages 27 and 28 and extend from points adjacent the sides of the passages 27 and 28 which are adjacent the lowermost edges of the throttle valves 21 and 22 in the closed positions thereof partway toward the opposite sides of the passages 27 and 28. The baffle plates 45 and 46 are heated by direct conduction from the tube 30 and extend transversely in relation to the direction of flow to provide an increased area for contact by fuel droplets and for radiation of heat into the fuel droplets to enhance the vaporization thereof. Preferably, each of the baffle plates 45 and 46 is generally elliptical in shape with the long dimension thereof being transverse to the axis of the tube 30. The baffle plates 45 and 46 are preferably provided with a plurality of apertures 45a and 46a as illustrated which is important in reducing the impedance to flow and also in allowing portions of the flow to be in close proximity to the high temperature outer surface portions of the tube 30.

As shown in FIG. 4, the baffle plate 45 is secured on the tube 30 by a bracket 48 having a generally U-shaped central portion extending around the tube 30 and having a pair of flange portions welded to the underside of the baffle plate 45. The baffle plate 45 and the U-shaped portion of the bracket 48 may preferably be also welded to the tube 30. A similar bracket is used for the baffle plate 46.

A very important feature of the invention relates to the control of the heat radiated into the fuel-air mixture. As disclosed in my aforesaid U.S. Pat. No. 3,556,065, the amount of heat is critical with respect to obtaining optimum performance. If the amount of heat is too small, there will be little increase in performance. If it is too large, the performance also drops off, apparently due to undue expansion of the fuel vapors and heating and expansion of the air. In accordance with this invention, the amount of heat is automatically controlled. In particular, the valves 39 and 40 are controlled by a solenoid 49 and solenoid 50 which are connected together and between ground and the output of a control circuit having an input connected through lines 53 and 54 to a thermocouple device 56. As shown in FIG. 3, device 56 includes a pair of conductors 57 and 58 of different metals and extending to a junction 59 in direct contact with the portion of tube 30 within the notch 33. The conductors 57 and 58 are disposed in an insulating material 60 within a passage 61 in the plate 24.

As shown in FIG. 5, one of the lines 53 is connected to one terminal of a junction 63 in the control unit 52 the other terminal of which is connected to ground and through a resistor 64 to the line 54. A voltage is developed across resistor 64 proportional to the difference in temperatures of the junctions 59 and 63 and having a polarity as indicated with junction 59 being at a temperature higher than that of the junction 63.

Line 54 is connected to the input terminal of a differential amplifiier 66 having a positive input connected through a variable resistor 67 to ground and connected through a temperature sensing resistor 68 to a power supply terminal 70. Amplifier 66 is connected to suitable supply terminals 71 and 72 and has an output connected through a resistor 73 to ground and connected directly to the base of a transistor 74 having an emitter connected to the solenoids 49 and 50 and having a collector connected to a power supply terminal 75.

In operation, if the voltage across the resistor 64 is lower than that across the resistor 67, the amplifier 66 supplied an output signal to the base of transistor 74 which conducts heavily to energize the solenoids 49 and 50 and to open the valves 39 and 40, thus allowing exhaust gas to flow through the tube 30 to heat the tube 30 and the baffle plates 45 and 46. When the temperature of the tube 30 increases to a point at which the voltage across resistor 64 exceeds that across the resistor 67, the amplifier 66 cuts off and no longer supplies an output signal to the base of the transistor 74 so that the solenoids 49 and 50 are deenergized and the valves 39 and 40 are closed. Thus the difference in temperature between the junction 59 and the junction 63 is maintained at a level determined by the reference voltage across resistor 67. The temperature responsive resistor 68 senses ambient temperature and the resistance thereof increases when the ambient temperature increases, thus reducing the voltage across the resistor 67. As a consequence, the voltage across the resistor 64 reaches a level such as to cut off the amplifier 66 with a smaller temperature difference between junctions 63 and 59. Thus in hot weather, when less heat is required for fuel vaporization, the temperature at the junction 59 is maintained at a lower level while in cold weather when more heat is required for fuel vaporization, the temperature of junction 59 is maintained at a higher level. Resistor 67 is adjustable to adjust the level of operation.

It is noted that with the arrangement, the amount of heat supplied varies with the amount of air supplied to the engine which is increased in proportion to the opening of the throttle valves and in proportion to the speed of operation of the engine. Increased air and fuel flowing past the device causes the increased absorption of heat, tending to reduce temperature but the control arrangement responds by supplying increased heat. This feature is generally desirable in that as flow of mixed air and fuel increases, the optimum amount of heat also increases.

It is noted that instead of using the two valves 39 and 40 as illustrated, a single valve may be used to supply high pressure exhaust gases to one end of the tube 30 with a conduit from the other end of the tube being provided for flow of the exhaust gas to a point in the exhaust system in which the pressure is reduced. Also, instead of a single tube as shown, a pair of tubes may be used extending through the openings 27 and 28 in directions transverse to the illustrated direction and connected in parallel. It is further noted that steam or other fluids, other than exhaust gas, may be used for heating.

It will be understood that other modifications and variations may be effected without departing from the spirit and scope of the novel concepts of this invention.

I claim as my invention:

1. In apparatus for improving the performance of an internal combustion engine including air-fuel mixing means, flow path means for flow of mixed air and fuel from said mixing means for combustion in said engine and throttle valve means for controlling said flow of mixed air and fuel, heater means disposed in said flow path means and having an internal fluid flow passage and an external surface for radiation of heat into the fuel, and fluid supply means for supplying a high temperature fluid to flow through said internal fluid flow passage to heat said external surface to a high temperature and to cause radiation of radiant heat from said external surface into the fuel for vaporization thereof, said heater means having a solid imperforate wall preventing flow of said high temperature fluid from said internal fluid flow passage into said mixed air and fuel flow path means, said high temperature fluid being supplied to continuously maintain said external surface at said high temperature during normal operation of the engine after warm-up thereof, and said fluid supply means being arranged to maintain the temperature of said external surface at approximately a predetermined high temperature through changes in the rate of flow of said high temperature fluid to said heater means, the rate of flow of said high temperature fluid being increased when the amount of heat radiated from said heater means is increased and being decreased when the amount of heat radiated from said heater means is decreased, said fluid supply means including control valve means for controlling flow of said high temperature fluid, temperature sensing means for responding to a temperature corresponding to the temperature of said external surface of said heater means, and control means coupled to said temperature sensing means and to said control valve means to control said control valve means from said temperature sensing means.

2. In apparatus as defined in claim 1, said temperature sensing means being arranged for developing an electrical signal corresponding to the temperature of said external surface of said heater means, and said control means comprising circuit means responsive to said electrical signal for controlling said control valve means.

3. In apparatus as defined in claim 2, ambient temperature sensing means for developing a second electrical signal corresponding to ambient temperature, said circuit means being responsive both to the first electrical signal and to said second electrical signal to control said control valve means.

4. In apparatus as defined in claim 3, said circuit means being arranged to reduce said certain temperature in response to an increase in ambient temperature.

5. In apparatus as defined in claim 1, said fluid supply means being arranged to supply high temperature exhaust gas from the engine to flow through said internal fluid flow passage.

6. In apparatus as defined in claim 1, wherein said flow path means includes metal wall means defining an air-fuel flow passage, said heater means including a tube for extending transversely through said flow passage and through opposed portions of said metal wall means, and heat insulating means insulating said tube from said metal wall means.

7. In apparatus as defined in claim 6, said heater means including a baffle plate supported on said tube in a plane generally transverse to the flow of mixed air and fuel in said passage.

8. In apparatus as defined in claim 7, said baffle plate having a plurality of apertures therethrough.

9. In apparatus as defined in claim 1, said engine being operable under certain normal ranges of load speed and ambient temperature conditions and having characteristics such that an optimum amount of radiant heat applied to enhance vaporization of fuel within said flow path means is effective to cause said engine to develop maximum average torque and acceleration while operating within said normal ranges of load, speed and ambient temperature conditions and with said throttle valve means fully open, average torque and acceleration being reduced in proportion to a reduction of the amount of radiant heat below said optimum amount and being also reduced in proportion to an increase in the amount of radiant heat above said optimum amount, said heater means being operative to radiate said optimum amount of radiant heat from said external surface into the fuel-air mixture in said flow path means.

\* \* \* \* \*